United States Patent [19]

Drijver et al.

[11] Patent Number: 5,630,591
[45] Date of Patent: May 20, 1997

[54] SEALING ELEMENT

[75] Inventors: Frans P. Drijver, Eze sur Mer; Leendert Poldervaart, La Turbie, both of France

[73] Assignee: Single Buoy Moorings Inc., Marly, Switzerland

[21] Appl. No.: 223,025

[22] Filed: Apr. 5, 1994

[30] Foreign Application Priority Data

Apr. 5, 1993 [NL] Netherlands .......................... 9300593

[51] Int. Cl.$^6$ .................................................. F16J 15/32
[52] U.S. Cl. ........................................ 277/164; 277/205
[58] Field of Search ................................ 277/159, 160, 277/163, 164, 205

[56] References Cited

U.S. PATENT DOCUMENTS

| | | | |
|---|---|---|---|
| 2,451,888 | 10/1948 | Thompson | 277/205 X |
| 2,594,164 | 4/1952 | Hedberg | 277/160 X |
| 3,114,561 | 12/1963 | Creath et al. | 277/205 X |
| 3,223,426 | 12/1965 | Reid | 277/205 |
| 3,847,389 | 11/1974 | Rogers | 277/205 X |
| 3,901,517 | 8/1975 | Heathcott | 277/205 |
| 4,133,542 | 1/1979 | Janian et al. | 277/164 X |
| 4,470,608 | 9/1984 | Warren | 277/164 |
| 4,585,238 | 4/1986 | Nicholson | 277/205 |
| 4,585,239 | 4/1986 | Nicholson | 277/205 |
| 4,830,344 | 5/1989 | Balsells | 267/167 |
| 5,163,692 | 11/1992 | Schofield et al. | 277/164 X |

FOREIGN PATENT DOCUMENTS

| | | | |
|---|---|---|---|
| 1231867 | 10/1960 | France | 277/205 |
| 2073048 | 9/1971 | France . | |
| 1045747 | 12/1958 | Germany | 277/205 |
| 1234105 | 2/1967 | Germany . | |
| 2111312 | 9/1972 | Germany . | |
| 2310365 | 11/1973 | Germany | 277/205 |
| 404191571 | 7/1992 | Japan | 277/205 |
| 888138 | 1/1962 | United Kingdom . | |

*Primary Examiner*—William A. Cuchlinski, Jr.
*Attorney, Agent, or Firm*—Young & Thompson

[57] ABSTRACT

Sealing element consisting of a body with at least one synthetic sealing lip provided to it. This synthetic sealing lip is pressed against the part that moves in relation to the part in which the body is provided. This pressure is realized with the aid of a spring. To spread the load in the spring evenly, the spring is made such that the moment of resistance against bending is substantially constant across the full extent of the spring.

8 Claims, 3 Drawing Sheets

SEALING ELEMENT

FIELD OF THE INVENTION

The subject invention relates to a sealing element to be placed between two parts which can move in relation to each other, comprising a body provided in one of these parts and at least one lip which is connected to that body and which must come into contact with that other part, wherein the lip is made of plastic material, wherein between that lip and the body a spring is present that on the one hand is in contact with that lip, and on the other hand is in contact with that body, or with a further lip that is connected to that body.

BACKGROUND OF THE INVENTION

Such a sealing element is generally known in prior art and is applied from very small to very large dimensions. Particularly for larger dimensions of, for example, an opening to be sealed, a comparatively large prestress of the lip against the part which can move relative to it is frequently required. Examples of this are lengths of pipeline which can move in relation to each other in high pressures lines. To guarantee such a high pressure of the lip against the moving part, various measures have been suggested in the prior art. One suggestion concerned bringing the lips under fluid pressure. Another suggestion comprised the installation of springs to press the lip against the related part. Particularly in cases of high pressure and for relatively small sealing elements, the problem exists of there not being enough space to insert a spring which can provide sufficient closing force.

OBJECT OF THE INVENTION

The objective of the invention is to provide a sealing element with a spring, wherein it is possible to apply sufficient pressure force to the lip in situations of relatively compact dimensions.

SUMMARY OF THE INVENTION

This objective is realized with a sealing element described above in that the material mass of the spring, from the part that engages the lip, to the part close to the body, varies such that the moment of resistance against bending in the spring is primarily adjusted to the locally present bending moment.

The invention is based on the idea of using the full extension of the spring to apply the pressure force to the lip, i.e. contrary to the prior art springs, wherein only the part close to the body is subjected to a large pressure, and the part close to the lip has a relatively small load, the spring is now so embodied that a primarily even loading occurs. This is of importance because all parts of the spring can then be loaded to just under the yield point. The prior art with loads close to the yield point at the part of the spring that is close to the body, meant hardly any load applied to the parts close to the lip.

Such an adjustment of the moment of resistance against bending to the anticipated local bending moment can be realized in three different ways, either separately or in combination with each other. Firstly, the thickness of the spring can vary such that relatively little material is present next to the lip, and, close to the body, relatively more. Secondly, the surface area, i.e. the width of the spring, can vary in the same way as mentioned above. Finally, it is possible to construct the spring from several spring elements, each with different dimensions. A similar part-by-part construction is, for example, known in carriage springs.

If the embodiment wherein the surface area of the spring increases from the lip towards the body is chosen, a similar variation can be achieved by providing perforations close to the lip. Another possibility is to make the spring in tongues, wherein the width of such tongues increase towards the body. Such tongues can be attached to each other at the free ends. By arranging these connections alternately, a flexible spring with the required characteristics is created.

It is obviously also possible to produce the spring as a coiled spring. In that case, preference is given to realize a coiled spring which is relatively small or has a relatively small surface area at the place of load i.e. at the lip, and is relatively thick or has a relatively large surface area close to the body.

The springs described above can be made of any material known in the art, such as types of composite or metal, such as stainless steel. The plastic material used for the sealing lip can also be made of any known prior art material, such as PTFE.

BRIEF DESCRIPTION OF THE DRAWINGS

The invention will be further explained below, referring to some examples of embodiments. Therein shows.

DETAILED DESCRIPTION OF THE PREFERRED EMBODIMENTS

Figure 1:
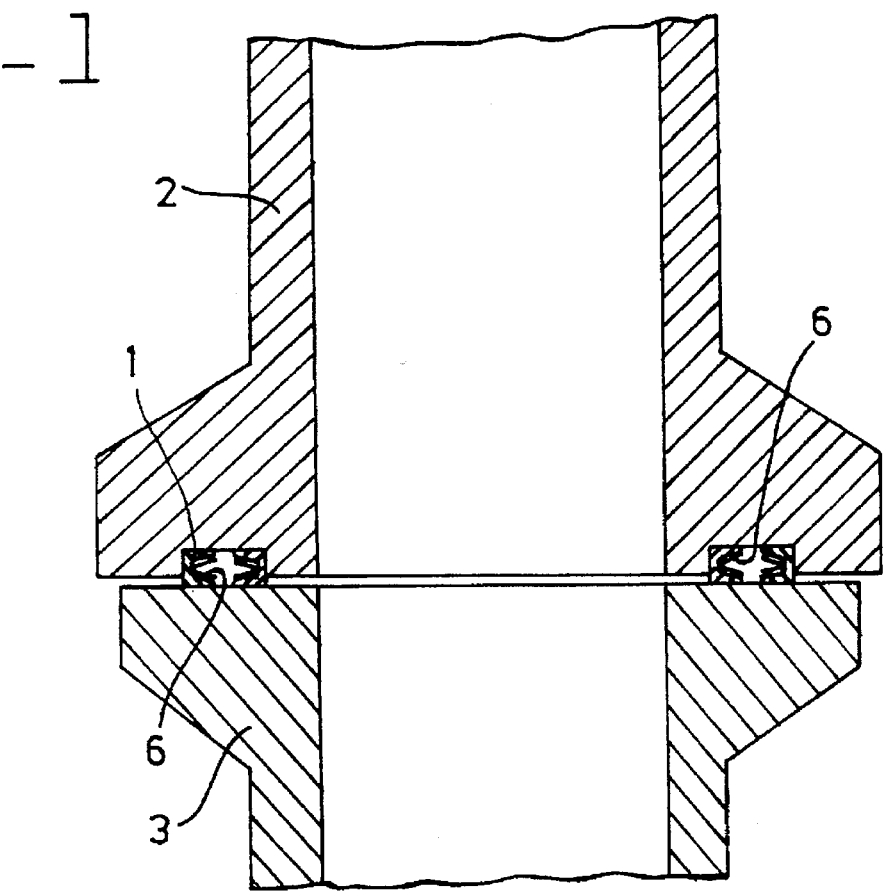
FIG. 1 a cross-section of the first application of the sealing element according to the invention.

In FIG. 1, two parts 2 and 3 which can move in relation to each other are shown, such as, for example, parts of a pipeline system for liquid under high pressure. As a non-limiting example, a value between 200 and 2500 mm is taken for the diameter of this line while the seal has dimensions of 10×30 mm. The pressure in such lines can lie between 4 and 700 bar. Such parts 2 and 3 are sealed by means of sealing elements 1.

Figure 2:
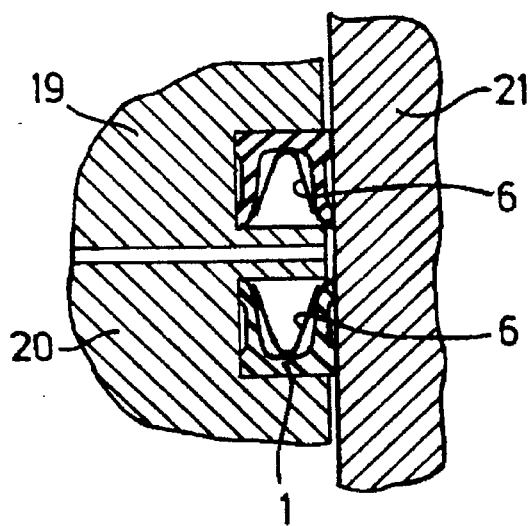
FIG. 2 a cross-section detail of a further application of the sealing element according to the invention.

A further construction, consisting of mutually moveable parts 19 and 20, which furthermore can move in relation to a wall 21, is shown in FIG. 2. Here also, sealing elements 1 are used.

Figure 3:
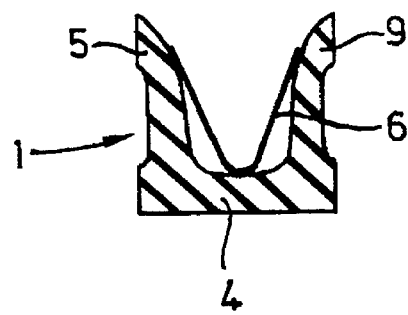
FIG. 3, the positioning of the spring in the sealing element according to FIGS. 1 and 2, on a larger scale.

As is shown in FIG. 3, such a sealing element consists of a body 4, lips 5 and 9, which extend from the body 4, and a spring 6 in the space bordered by the lips 5 and 9 and the body. This spring 6 serves to apply a closing force, so providing a seal between the lips and the parts which move in relation to them. In this case, both the body 4 and the lips 5 and 9 can be made of the same plastic material, such as PTFE. In all cases, it is important that the lip which is subjected to a sliding movement has the necessary properties.

Figure 4:
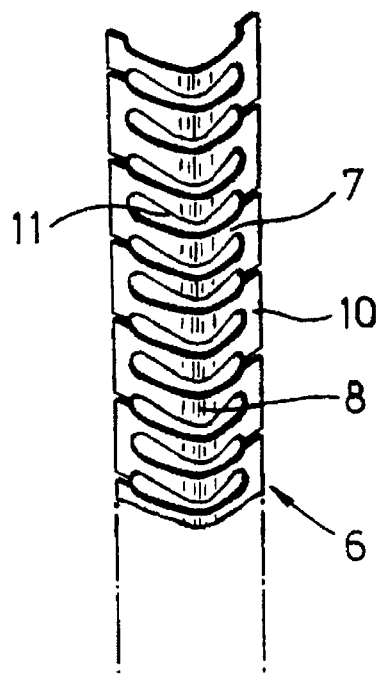
FIG. 4 a perspective view of the spring shown in FIG. 3.

The spring shown in FIG. 3 is shown in perspective in FIG. 4. It can be seen that this comprises a number of tongues 7, which are connected with each other by means of bridges 10. Each tongue comprises a relatively wide part 8 and a relatively narrower part 11. In this case, part 11 should engage the lip while part 8 engages the body, or lies close to the body, as in the embodiment shown. When a load is then applied to spring 6, the force exerted on lip 5 or 9 will be transferred to the lip lying opposite and so to the part in question. By varying the surface area of the spring while the thickness remains constant, a constant stress distribution across the spring will occur, i.e. a maximum amount of energy is elastically recoverable stored in the spring so that a closing force as large as possible can be realized with a spring volume as small as possible.

Figure 5:
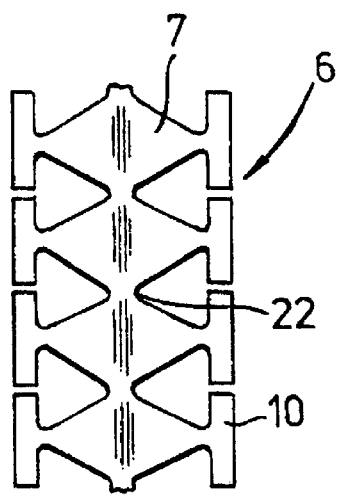
FIGS. 5–7 variations of the embodiment according to FIG. 4.
Figure 7:
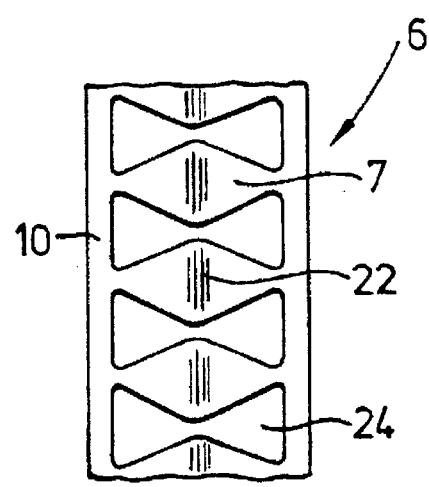
Figure 6:
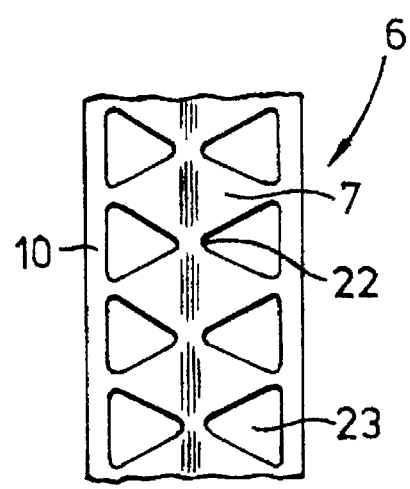

Further variations of the spring according to FIG. 4 are shown in FIGS. 5–7. The effect obtained with these variations corresponds primarily with what is shown in that figure. In FIG. 5, no connection using bridge 10 is employed, but bodies 22 provide connection between the separate tongues 7. In the embodiment according to FIG. 6, triangular-shaped recesses 23 are provided, wherein both the bridges 10 and bodies 22 are present, while the recesses 24 in the embodiment shown in FIG. 7 are continuous.

Figure 8:
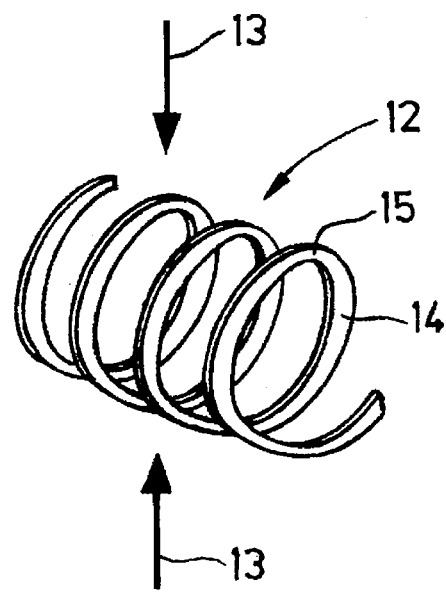
FIG. 8 a coiled spring which can be used in the sealing element according to the invention.

FIG. 8 shows a coiled spring which can be installed in the sealing element 1 according to the invention, but also in any other sealing element to be constructed. This coiled spring is indicated with 12 and the forces working on it with arrows 13. From the above, it follows that the part on which the force engages, indicated with 15, must be relatively thin, while the part that is most subjected to bending, indicated with 14, must be relatively thick.

Figure 9:
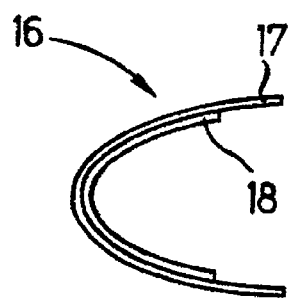
FIG. 9 a spring comprising two part-springs also to be used in the sealing element according to the invention.

FIG. 9 shows another possibility for a spring 16 to be used with the sealing element according to the invention. This spring 16 comprises two part-springs 17 and 18. In this case, the outer spring 17 has a greater size than the inner spring 18. In this way, a constant stress distribution over the material is obtained.

Figure 10:
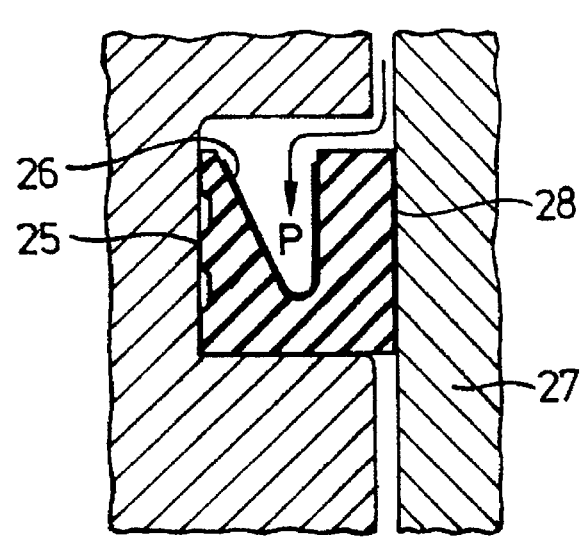
FIG. 10 a subsequent embodiment of the sealing element according to the invention.

FIG. 10 depicts a further embodiment of the invention. In this case, a single lip 25 is present which provides sealing, while spring 26 corresponds with the embodiment shown above. In this case, the sealing in relation to shaft 27 is a permanent pressed fit 28.

Although the invention above is described using several embodiments, it must be understood that numerous alterations can be made without going beyond the limits of the subject application. Instead of U-shaped springs, L-shaped springs can also be used wherein the body of the L is in contact with the body of the sealing element. Furthermore, the body-lip combination of the actual sealing element can be produced in all other ways known in the art. The idea of the subject invention is applicable to all seals wherein, with the aid of a spring, the synthetic material used for the lip is supported.

We claim:

1. Annular sealing element to be placed between two moveable parts which can move in relation to each other, said annular sealing element having a diameter greater than 20 cm, comprising a body provided in one of the moveable parts and two lips which are connected to the body and which engage the other moveable part, said lips being made of synthetic material, wherein between the lips and the body, a spring is present having two upstanding members which each engage a respective lip, and an intermediate member interconnecting the upstanding members and engaging the body, said spring being made of a material having a primarily constant thickness and a surface area which for the upstanding members which are in contact with the lips, is smaller than that of the intermediate member, such that the moment of resistance against bending in the spring is substantially constant over its length for the intermediate member and for the upstanding members.

2. Annular sealing element according to claim 1, wherein the upstanding members of the spring which engage the lip, comprise an engagement portion realizing a substantially continuous line of contact with said lip and connected there to an end portion of the spring having a tapered shape.

3. Annular sealing element according to claim 1, wherein the smaller surface area of the upstanding members is achieved by perforations.

4. Annular sealing element according to claim 1, wherein the spring is U-shaped and includes a plurality of contiguous tongues, each tongue having a varying width.

5. Annular sealing element according to claim 4, wherein the tongues have free ends which are connected alternately.

6. Annular sealing element according to claim 1, wherein the spring is made of metal.

7. Annular sealing element according to claim 1, wherein the synthetic material of the sealing lip comprises PTFE-material.

8. Annular sealing element to be placed between two moveable parts which can move in relation to each other, said annular sealing element having a diameter greater than 20 cm, comprising a body provided in one of the moveable parts and at least one lip which is connected to the body and which engages the other moveable part, said lip being made of synthetic material, wherein between the lip and the body, a spring is present, having a first part which engages the lip, and a second part which engages one of the body and a further lip that is connected to the body, said spring being U-shaped, and being made of a material having a primarily constant thickness and a surface area which for the first part which engages the lip is smaller than the second part, said spring including a plurality of contiguous tongues, each tongue having a varying width, said tongues being connected to each other at their free ends, and wherein the moment of resistance against bending in the spring is substantially constant over its length between the point of engagement of the first part of the spring with the lip and the second part.

* * * * *